(12) United States Patent
Astegno et al.

(10) Patent No.: US 6,761,326 B2
(45) Date of Patent: Jul. 13, 2004

(54) BASE FOR STORING AN ELECTRICAL FOOD PROCESSOR ACCESSORIES

(75) Inventors: Jean-Paul Astegno, Espoey (FR); Lionel Peyras, Jarret (FR)

(73) Assignee: SEB S.A., Ecully (FR)

(*) Notice: Subject to any disclaimer, the term of this patent is extended or adjusted under 35 U.S.C. 154(b) by 0 days.

(21) Appl. No.: 10/169,136

(22) PCT Filed: Oct. 11, 2001

(86) PCT No.: PCT/FR01/03148
§ 371 (c)(1),
(2), (4) Date: Jun. 27, 2002

(87) PCT Pub. No.: WO02/34097
PCT Pub. Date: May 2, 2002

(65) Prior Publication Data
US 2003/0071152 A1 Apr. 17, 2003

(51) Int. Cl.$^7$ ............................................. A47J 43/046
(52) U.S. Cl. ............................. 241/285.1; 241/282.1
(58) Field of Search ..................... 241/282.1, 282.2, 241/199.12, 285.1; 206/372, 373; D7/637, 383, 384; 211/70.6

(56) References Cited

U.S. PATENT DOCUMENTS

| 4,334,724 A | 6/1982 | Rogers, Sr. |
|---|---|---|
| 4,456,185 A | 6/1984 | Ribassin et al. |
| 4,733,827 A | 3/1988 | Williams |
| 4,856,718 A * | 8/1989 | Gaber et al. ................. 241/93 |
| 5,289,760 A * | 3/1994 | Barradas ...................... 99/331 |
| D403,927 S * | 1/1999 | Hippen et al. ............... D7/637 |
| 6,616,324 B1 * | 9/2003 | Planca et al. ............... 366/205 |

FOREIGN PATENT DOCUMENTS

WO          WO 01 30222          5/2001

* cited by examiner

Primary Examiner—Mark Rosenbaum
(74) Attorney, Agent, or Firm—Browdy and Neimark, P.L.L.C.

(57) ABSTRACT

The invention concerns a box for storing the working accessories of an electrical food processor, comprising a base (3) including a lower resting surface and a lid including an upper surface designed to receive an electrical food processor. The invention is characterised in that an inner surface (38) of the base (3), respectively an inner surface of the lid, comprises at least a configuration (43, 44, 53, 61) whereon are arranged non-peripheral support means (45, 46, 54, 62) designed to co-operate with an inner surface of the lid or with non-peripheral support means complementarily arranged on a configuration of the lid inner surface, respectively with an inner surface of the base, when the lid closes the base.

10 Claims, 3 Drawing Sheets

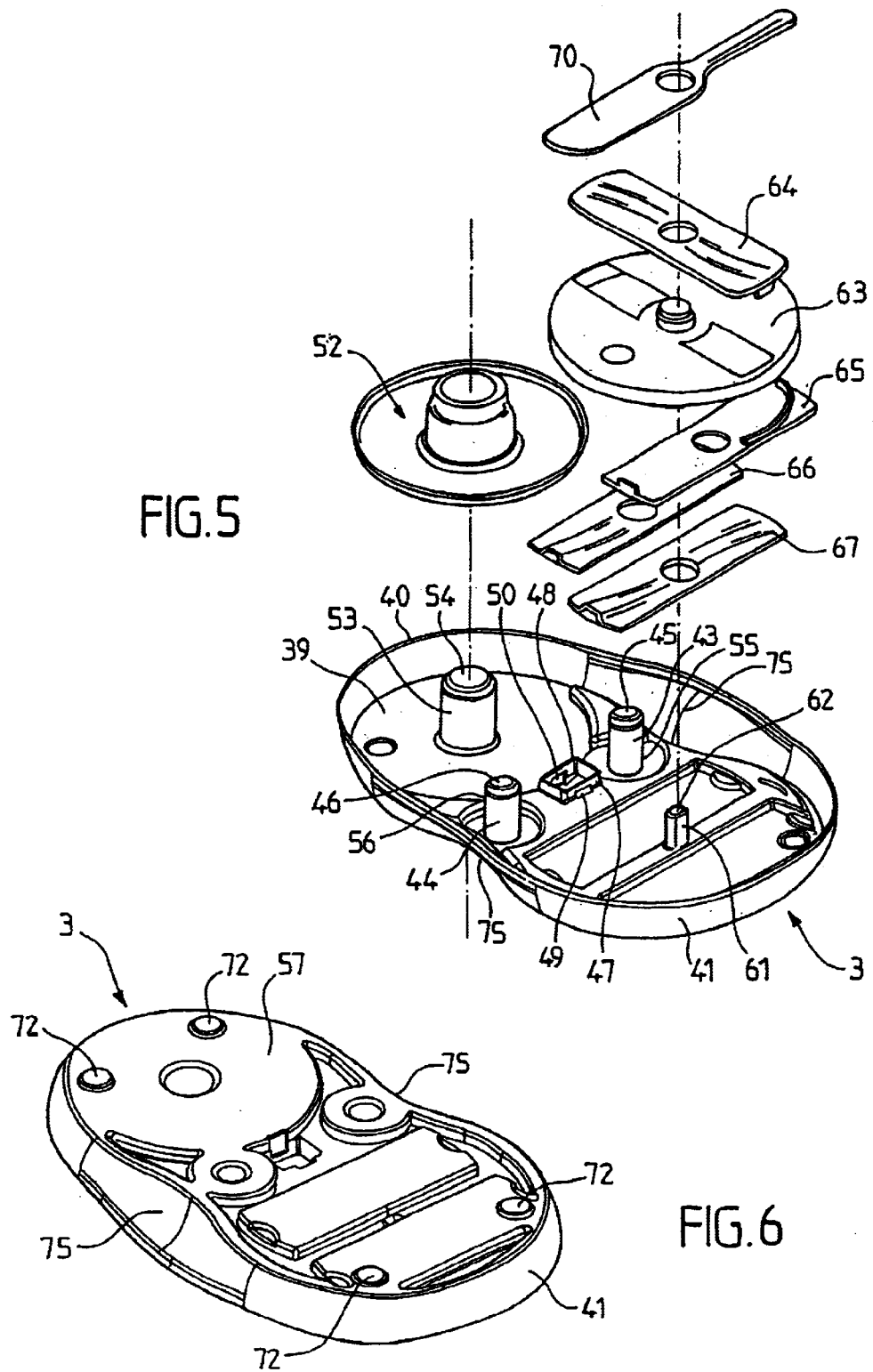

BASE FOR STORING AN ELECTRICAL FOOD PROCESSOR ACCESSORIES

The present invention concerns the general technical field of electrical food processors and relates more particularly to storage of the accessories of these appliances.

It is known to produce boxes for storing the accessories of an electrical food processor, having a housing closed by a lid. However, when the surface of the lid is sufficient to serve as a support for the corresponding appliance, the rigidity of the lid is then insufficient to usefully permit such a utilization.

The object of the present invention is to provide a storage for the rotateable working accessories of an electrical food processor, being able to serve as the base of said appliance, and the fabrication of which is economical.

Another object of the present invention is to provide a storage for the rotateable working accessories of an electrical food processor, of which the sensitivity to vibrations is reduced.

These objects are achieved with a box for storing the working accessories of an electrical food processor, composed of a base including a lower resting surface and a lid, comprising an upper surface designed to receive an electrical food processor, by the fact that an inner surface of the base, respectively an inner surface of the lid, comprises at least one configuration whereon are arranged non-peripheral support means designed to cooperate with an inner surface of the lid or with non-peripheral support means complementarily arranged on a configuration of the inner surface of the lid, respectively with an inner surface of the base, when the lid closes the base. The contact between the non-peripheral support means and the inner surface disposed in a facing relation can be obtained upon closing of the storage box, or in the presence of the appliance disposed on the upper surface of the lid. Due to the non-peripheral support means, disposed beyond the periphery of the lid and the base, flexure of the lid can be limited when an electrical food processor is disposed on said box. By this fact, the thicknesses of the lid and of the base can be reduced. This arrangement permits reduction of the cycle time for molding of the lid and the base, as well as the quantities of material necessary. Moreover, the presence of non-peripheral support means permits easier use of plastic materials other than the plastic materials considered to be rigid, such as ABS or SAN. The utilization of polypropylene or of polyethylene can for example be envisioned. Less rigid materials present the advantage of a better damping of vibrations, which permits noise to be limited when an electrical food processor is utilized on the storage box.

According to one embodiment, the non-peripheral support means of the configuration or of at least one of the configurations are arranged in a zone comprised between the center of the inner surface and a third of the distance to the lateral edge of the base or of the lid. A support in the central zone effectively permits flexure of the lid to be limited. According to another embodiment, three configurations are arranged in a triangle around the center of the inner surface of the base or of the lid, the non-peripheral support means of two configurations and the center having an angle comprised between 60 and 150 degrees. According to another embodiment the center of the inner surface is disposed between two configurations furnished with non-peripheral support means. Such supports equally permit flexure of the lid to be effectively limited.

Advantageously the configuration or at least one of the configurations of the base presents a lateral support zone with a lateral support zone of the configuration or at least one of the configurations of the lid. This arrangement improves the connection between the base and the lid.

Advantageously then the configuration or at least one of said configurations is transversally flexible. This arrangement permits achieving lateral immobilization of the lid with respect to the base, and thus to reduce the phenomena of vibration in the storage box generated by the household electrical appliance disposed on said box. Said configuration can particularly be tubular.

Advantageously in order to facilitate the storage of accessories, the configuration or at least one of the configurations of the base and/or the configuration or at least one of the configurations of the lid is provided to serve as a support for a rotateable working tool of the electrical food processor.

According to an advantageous configuration the base and the lid form two half-shells, this arrangement permitting an improvement in the rigidity of the storage box.

Advantageously also, the lid has on the upper surface an opening permitting the introduction of a finger to actuate a moveable and/or elastic piece of the lid, respectively of the base, having attachment means provided to cooperate with holding means of the base, respectively of the lid. This arrangement permits the box and the lid to be fastened together while facilitating unlocking.

Advantageously then the upper surface of the lid has two openings disposed to one side and the other of the center of the lid and two parallel pieces in the form of tongues, extending from the inner surface of the lid, are disposed between the openings, the attachment means being arranged on the surfaces of the pieces disposed to the side of the openings. The user can then introduce the thumb and index finger in order to unlock the lid from the base.

The invention will be better understood from a study of an example of construction, taken as a non-limiting example, and illustrated in the attached figures, in which:

FIGS. 4 and 5 are views showing, respectively without accessories and with accessories, the upper surface of the base illustrated in FIG. 1, and FIG. 6 is a view showing the lower surface of said base.

Figure 1:
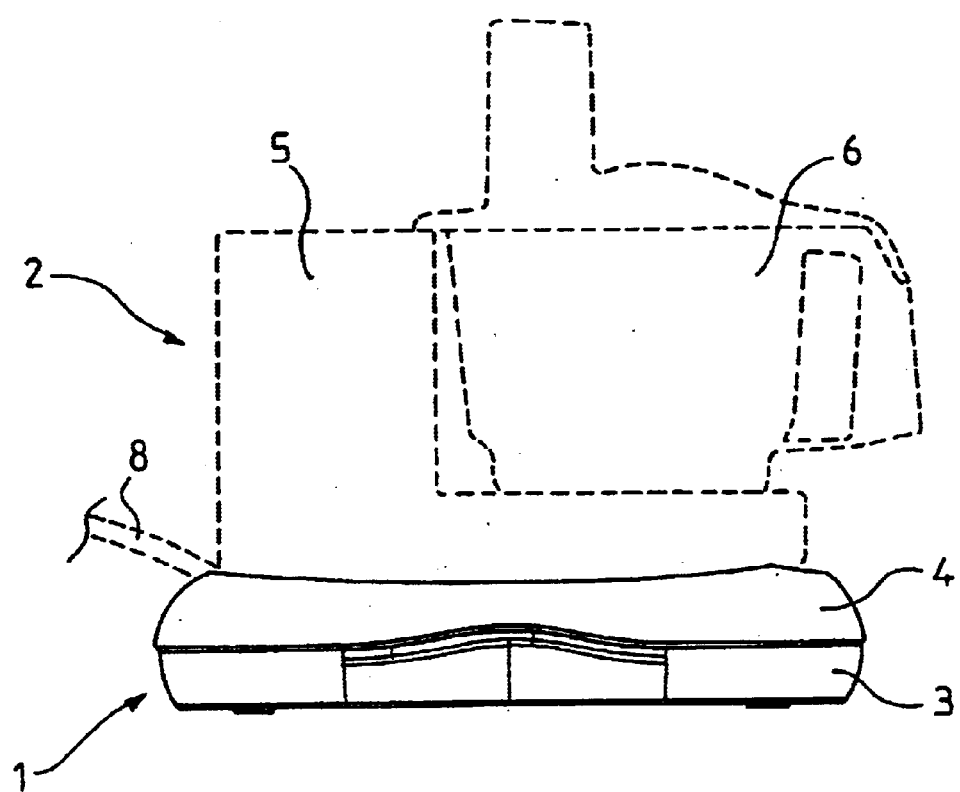
FIG. 1 is a schematic view of a base forming a storage box according to the invention, having a base and a lid.

FIG. 1 shows an example of construction of a box 1 for storing accessories forming a base provided in order to be disposed under an electrical food processor 2. Storage box 1 has a base 3 closed by a lid 4. Appliance 2 has a motor housing 5 and a working receptacle 6 as well as rotateable working tools mounted on a removable hub, visible in FIG. 4. Receptacle 6 is disposed on motor housing 5 supplied by an electric cord 8. Such an appliance has a drive partly below receptacle 6, known per se and not shown in the drawings. However, an appliance having a drive in part above the receptacle can also be utilized on storage box 1.

Figure 2:
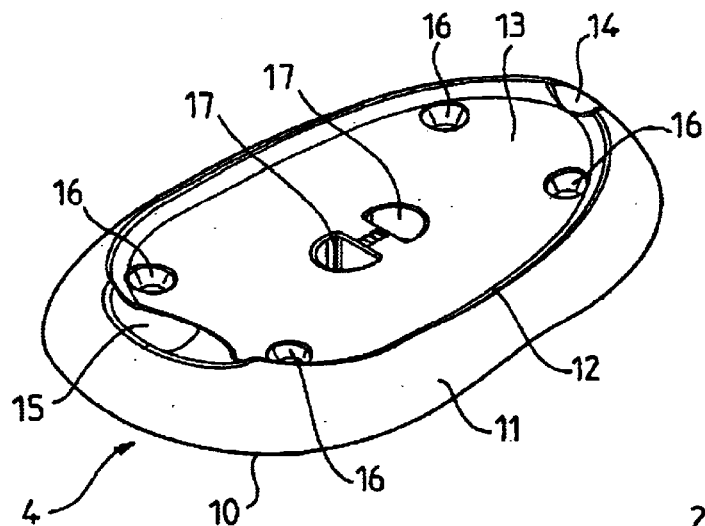
FIGS. 2 and 3 are views showing respectively the upper and lower surfaces of the lid illustrated in FIG. 1.
Figure 3:
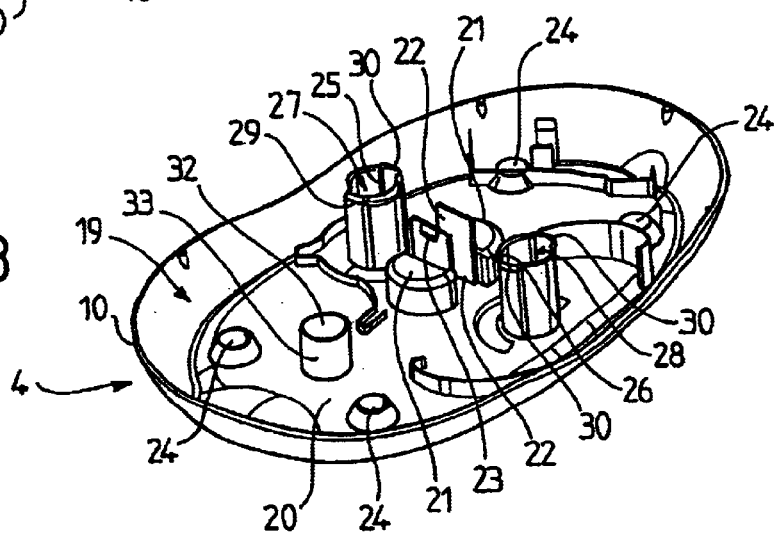

Lid 4 shown in FIGS. 2 and 3 has a lower peripheral edge 10 connected by a lateral wall 11 to an upper peripheral edge 12 surrounding an upper surface 13. Lid 4 has a form that is elongated in a longitudinal direction. A notch 14 arranged in upper edge 12 is provided for the passage of the electric cord of the appliance (shown in FIG. 1). Another notch 15 arranged in upper edge 12 in the opposite half of lid 4 is provided for the passage of fingers under the housing of the appliance, in order to facilitate withdrawal of the appliance from the base. Depressions 16 arranged on upper surface 13 form retaining means provided to receive the support means disposed under the appliance. By way of variation, a single depression, for example non-circular, can be envisioned on the upper surface of the base, or even one or several ribs provided to cooperate with a lateral surface of the electrical food processor or with a configuration of the lower surface of said appliance. Two openings provided for the passage of a finger are advantageously provided on surface 13, substantially at the middle of said surface.

Figure 4:
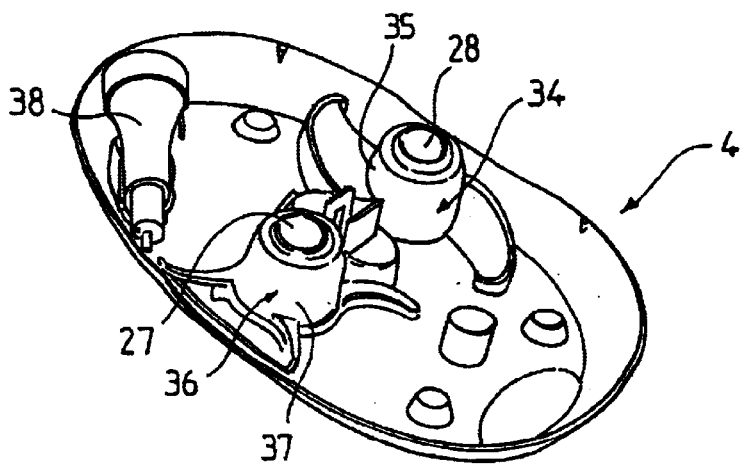

Lid 4 represented in FIGS. 2 to 4 has a lower peripheral edge connected by a lateral wall 11 to an upper peripheral edge 12 surrounding an upper surface 13. Lid 4 presents a form that is elongated in a longitudinal direction. A notch 14 arranged in upper edge 12 is provided for the passage of the electric cord of the appliance (shown in FIG. 5). By way of variation, a single depression, for example non-circular, can be envisioned on the upper surface of the base, or even one or several ribs provided to cooperate with a lateral surface of the electrical food processor or with a configuration of the lower surface of said appliance. Two openings provided for the passage of a finger are advantageously provided on surface 13, substantially at the middle of said surface.

As is better seen in FIG. 3, lid 4 has an inner surface 19 presenting a bottom 20 from which rise two steps 21 corresponding to the openings 17 visible in FIG. 2. Two elastic pieces 22 in the form of tongues are disposed facing one another between steps 21. The upper ends of the exterior surfaces of pieces 22 have retaining means 23 such as clips.

The lateral surfaces of the steps adjacent to pieces 22 are hollowed out in a manner to permit an actuation of the outer surfaces of pieces 22 in the form of tongues through openings 17. If desired, pieces 22 can be associated with a metal blade in order to obtain a better elasticity. By way of variation, pieces 22 can be moveable pieces associated with an elastic restoring means. Also by way of variant, a single moveable or flexible piece can be envisioned.

Bottom 20 has bosses 24 corresponding to the depressions 16 of the upper surface. Two configurations 27, 28 are disposed on the inner surface 19 to one side and the other of steps 21 substantially in a direction perpendicular to the longitudinal direction. Configurations 27, 28 are tubular and present uncoupling elements 29, 30 permitting to give them a slight transverse flexibility. Another configuration 33 is formed by a step disposed along the longitudinal direction.

As shown in FIG. 4, two rotateable tools 34, 36 each having an axial crown 35, 37 can be housed respectively around configurations 27, 28. Tools 34, 36 are provided to be mounted on a removable hub 38.

Base 3 represented in FIGS. 5 and 6 has an upper peripheral edge 40 fitted to edge 10 of lid 4. Edge 40 is connected by a lateral wall 41 to a bottom 42. Base 3 is elongated with respect to a main direction. Base 3 has with respect to this main direction lateral surfaces having in their median part a reinforcement 75. Base 3 thus has two diametrically opposed reinforcements 75, forming gripping means permitting the base to be lifted. As a variation, other gripping means can be envisioned.

Two configurations 43, 44 are arranged on an inner surface 39 of base 3. Configurations 43, 44 are constituted by steps extending vertically from bottom 42. Configurations 43, 44 are disposed to one side and the other of ribs 47, 48 disposed in a central manner on surface 39. Configurations 43, 44 are disposed substantially halfway between edge 10 and the center of surface 39. The base has retaining means 49, 50 provided to cooperate with attachment means 23 of pieces 22, such as cut-outs arranged on ribs 47, 48. Other configurations 53, 61 are disposed along the longitudinal direction substantially halfway between edge 10 and the center of surface 39, to one side and the other of said center. Configurations 53, 61 are provided respectively to receive a rotateable tool 52 and a rotateable tool 63 serving as a support for cartridges 64, 65, 66, 67.

Storage box 1 can be defined by a maximal length in a direction called main, by a maximum width in the direction perpendicular to said length, and by a height. The height of box 1 is less than one-third of the maximum length, and as illustrated in FIGS. 1 to 6, is the order of one-quarter of said length. Peripheral edge 10 of lid 4 and peripheral edge 40 of base 3 form peripheral support means.

Base 3 has a lower resting surface 57. In the example illustrated in FIG. 6, lower resting surface 57 has four supporting feet 72. The upper surfaces of configurations 61, 53 of base 3 disposed beyond the periphery of the base form non-peripheral support means 62, 54, provided to cooperate respectively with bottom 20 of lid 4 and with the upper surface of configuration 33 of lid 4. The upper surface of configuration 33 of lid 4 equally forms a non-peripheral support means 32 when lid 4 closes base 3.

Configurations 43, 44 of base 3 engage in tubular configurations 27, 28 of lid 4. The lateral wall of configuration 43, respectively of configuration of 44, forms a lateral support zone 55, respectively a lateral support zone 56, with the internal wall of tubular configuration 27, respectively of tubular configuration 28 forming equally a lateral support zone 25, respectively a lateral support zone 26. Preferably, configurations 27, 28 are transversely flexible in a manner to exert a light gripping of configurations 43, 44, thus improving the transverse immobilization of lid 4 on base 3.

The upper surface of each of the configurations 43, 44 of base 3 can equally form a non-peripheral support means 45, 46 with the lid, and the upper surface of each of configurations 27, 28 of lid 4 can equally form a non-peripheral support means with base 3.

As an example of variation, the contact between at least one of the configurations of the base, respectively of the lid, and the inner surface or the associated configuration of the lid, respectively of the base, can intervene only when food processor 2 is disposed on storage box 1.

As in example of a variation, the locking piece or pieces 22 can be fixed to the base, the holding means then being disposed in the lid.

As an example of variation, flexible configurations 27, 28 could be arranged on the base or be distributed between the base and the lid. A single flexible configuration, for example central, can also be envisioned. The number of flexible configurations is not limited to one or two, but can be greater, for example the order of three or four.

One or several configurations can be arranged in a different manner on the inner surface of the lid and/or of the base without departing from the framework of the invention.

By way of example the non-peripheral support means of one or several configurations can be arranged in a zone comprised between the center of the inner surface and one-third of the distance to the lateral edge of the base or of the lid.

Also by way of example, three configurations can be arranged in a triangle around the center of the inner surface of the base or of the lid, the non-peripheral support means of two distinct configurations and the center of the base or of the lid forming an angle comprised between 60 and 150 degrees.

Numerous improvements can be provided to this storage box within the framework of the claims.

The present invention finds an industrial application for storage boxes for electric food processors such as particularly multi-function food processors, mini-choppers, blenders or screw grinders.

What is claimed is:

1. A box for storing the working accessories of an electrical food processor, said box comprising: a base (3) having a lower resting surface (57); and a lid (4) having an upper surface (13) designed to receive an electrical food processor, characterized in that one of an inner surface (39) of the base (3), and an inner surface of the lid is composed of at least one configuration (43, 44, 53, 61) whereon are arranged non-peripheral support means (45, 46, 54, 62) designed to cooperate with one of the inner surface (39) of the lid (4) and non-peripheral support means (32) complementarily arranged on a configuration (33) of the other one of the inner surface of the base and the inner surface of the lid, when the lid closes the base.

2. Box for storing according to claim 1, characterized in that the non-peripheral support means of the at least one configuration are arranged in a zone comprised between the center of the inner surface and one-third of the distance to the lateral edge of the base or of the lid.

3. Box for storing according to claim 1, characterized in that three configurations are arranged in a triangle around the center of the inner surface of the base or of the lid, the non-peripheral support means of two configurations and the center forming an angle comprised between 60 and 150 degrees.

4. Box for storing according to claim 1, characterized in that the center of the inner surface (39) of the base (3) and/or of the inner surface of the lid is disposed between two configurations (43, 44; 53, 61), each furnished with non-peripheral support means (45, 46; 54, 62).

5. Box for storing according to claim 1, characterized in that the at least one configuration (43, 44) of the base (3) presents a lateral support zone (55, 56) with a lateral support zone (25, 26) of at least one configuration (27, 28) of the lid (4).

6. Box for storing according to claim 5, characterized in that at least one of said configurations (27, 28) is transversally flexible.

7. Box for storing according to claim 1, characterized in that at least one configuration (53, 61) of the base (3) and/or at least one configuration (27, 28) of the lid (4) is provided to serve as a support for a rotatable working tool (52, 63; 34, 36) of the electrical food processor.

8. Box for storing according to claim 1, characterized in that the base (3) and the lid (4) form two half-shells.

9. Box for storing according to claim 1, characterized in that the lid (4) has on the upper surface (13) an opening (17) permitting the introduction of a finger to actuate a moveable and/or elastic piece (22) of one of the lid (4) and the base, composed of attachment means (23) provided to cooperate with holding means (49, 50) of the other one of the lid and the base (3).

10. Box for storing according to claim 9, characterized in that the upper surface (13) of the lid (4) has two openings (17) disposed to one side and the other of the center of the lid (4), and in that two parallel pieces (22) in the form of tongues, extending from the inner surface (19) of the lid (4), are disposed between the openings (17), the attachment means (23) being arranged on the surfaces of the pieces (22) disposed to the side of the openings (17).

* * * * *